Patented Jan. 5, 1943

2,307,244

UNITED STATES PATENT OFFICE 2,307,244

PRODUCTION OF INDOLES

Louis Spiegler, Woodbury, N. J., assignor to E. I. du Pont de Nemours & Company, Wilmington, Del., a corporation of Delaware No Drawing. Application September 6, 1941, Serial No. 409,829

15 Claims. (Cl. 260—319)

This invention relates to the production of indoles, and particularly to their production by the catalytic hydrogenation of indigos and leuco-indigos.

The indoles, and particularly indole itself, are known compounds useful as perfume bases in soaps, cosmetics and related products. Indole itself occurs naturally in a number of natural products. Various methods have been proposed for synthesizing the indoles. It has been proposed to produce indole from indigo by a preliminary reduction with tin and hydrochloric acid followed by destructive reduction with zinc dust at distillation temperatures. It has also been proposed to produce indole by the distillation of indigo with the aluminum powder at red heat. These various processes have been difficult to carry out and have required specially trained operators and special handling.

It is an object of my invention to provide a new and improved process of producing indoles, and particularly indole itself. Another object is to provide a method of producing indoles by the catalytic hydrogenation of indigos and leuco-indigos. A further object is to provide an economical readily operable process of producing indoles from cheap, readily available and relatively stable materials. Other objects are to advance the art. Still other objects will appear hereinafter.

The above and other objects of my invention may be accomplished by catalytically hydrogenating alkaline pastes of indigos and leuco-indigos in water, employing an active reduced metal as a catalyst. After the hydrogenation is complete, the indole may be readily separated from the reaction mass by any desired method. I have found that this process is easily operated in an economical manner. The indigos and leuco-indigos are cheap, readily available and relatively stable materials.

The indigos, which may be treated in accordance with my invention, include indigo itself, as well as its homologues and substituted derivatives, containing substituents, such as chlorine, bromine, hydroxy groups, amino groups, sulfo groups and alkyl groups. Upon hydrogenation, in accordance with my invention, such indigos will yield the corresponding indoles. Likewise, leuco-indigos, which may be treated in accordance with my invention to produce the corresponding indoles, include leuco-indigo itself, its derivatives and substituted leuco-indigos in which the substituents may be chlorine, bromine, hydroxy groups, amino groups, sulfo groups and alkyl groups.

The indigos and leuco-indigos are treated in accordance with my invention in the form of alkaline pastes. The paste may contain from 5% to 30% of indigo or leuco-indigo solids. When pastes, containing a higher concentration than 10% indigo or leuco-indigo, are treated, the best results are obtained by dispersing the paste in the aqueous medium before hydrogenation, employing a suitable emulsifying agent, such as, for example, naphthalene sulfonate formaldehyde condensation products. The alkali, employed in the paste, may be any alkaline material and preferably is an alkali or an alkaline earth hydroxide, such as sodium hydroxide, potassium hydroxide, calcium hydroxide and barium hydroxide. The amount of the alkaline material may be varied within a wide range so long as a distinctly alkaline paste is produced. Preferably, the alkaline material amounts to from about 1 to about 10 parts per mole of indigo or leuco-indigo.

The aqueous medium is preferably water. However, when the concentration of indigo or leuco-indigo in the paste is high, it will be preferred that an emulsifying agent be present to properly disperse the indigo and leuco-indigo in the water.

The paste, in the aqueous medium, is treated with hydrogen under pressure. The pressure may be varied from about 300 pounds to about 2000 pounds per square inch with good yields. Preferably, however, I employ a hydrogen pressure of from about 500 to about 1000 pounds.

The catalyst may be any catalytically active reduced metal employed for catalyzing hydrogenation reactions, such as nickel, cobalt, copper, silver, chromium, paladium and platinum. The catalyst may be a single metal, a mixture of 2 or more metals or compounds thereof. For example, cobalt sulfide and nickel carbonate are suitable catalysts. Also, I have found that mixtures of metals, such as mixtures of nickel and copper, copper and cobalt, nickel copper and cobalt are particularly suitable for my purpose. I particularly prefer to employ nickel and nickel carbonate as the catalysts in my process. The catalyst may be unsupported or may be supported on a suitable material, such as kieselguhr, fuller's earth, hydrated aluminum oxides and the like. The supported catalysts can be made in any well known manner, such as by precipitation of a metal compound on the support and then igniting in an atmosphere of hydrogen by well known methods. For example, nickel hydroxide or nickel carbonate may be precipitated on kieselguhr and then ignited to produce a suitable catalyst for my invention. Such a supported catalyst will generally contain approximately 12 to 40% of catalytically active metal.

The catalysts will be employed in the proportion of from about 0.002 to about 0.09 part of active metal for each part of the indigo or leuco-indigo to be hydrogenated. Preferably, I employ the catalyst in the proportion of from about 0.003 to about 0.009 part of active metal for each part of indigo or leuco-indigo. I particularly prefer to employ from about 0.003 to about 0.009 part of the catalyst when the catalyst is reduced nickel and the process is carried out on a commercial scale.

The reaction should be carried out at temperatures of from about 190° C. to about 260° C., and preferably at temperatures between about 200° C. and about 250° C. The reaction is very slow when the temperatures fall below 200° C. On the other hand, there is a tendency to form undesirable by-products when temperatures above 250° C. are employed.

Agitation of the reacting ingredients and the reaction mass is required during the hydrogenation in order to obtain practical and efficient hydrogenation of the indigo or leuco-indigo to the indole. Vigorous agitation materially shortens the time required for the reaction to take place.

The time required for the reaction will vary greatly with the temperatures and pressures employed and with the degree of agitation. Generally, good results are obtained in from 3 to 16 hours, depending upon the particular conditions employed.

After the reaction is complete the indole may be separated from the reaction mass in various ways. It may be separated by distillation with water or steam. The mass may be extracted with a solvent or solvents and the indole recovered by crystallization, fractional distillation and other well known procedures.

In order to illustrate my invention more clearly, a mode of carrying the same into effect and the advantageous results to be obtained thereby, the following examples are given:

EXAMPLE I

*Catalytic hydrogenation of indigo*

Thirty parts of indigo are pasted with 120 parts of water and 18.4 parts of caustic soda. This paste and 350 parts of water and 7 parts of a catalyst consisting of reduced nickel on kieselguhr (30–40% nickel) are charged into a steel autoclave. The autoclave is heated to 250° C. while agitating vigorously and the charge is saturated with hydrogen at 1,000 lbs. per sq. in. until absorption is complete. The time required to complete the reaction is 12–14 hours. To obtain the desired indole, the reduced mass is neutralized with $CO_2$ or mineral acid until barely alkaline and steam distilled. Technical indole, melting range 47–49° C. is obtained in the distillate. Recrystallization from petroleum ether yields reasonably pure indole which melts at 52° C. Graphically represented, the reaction is as follows:

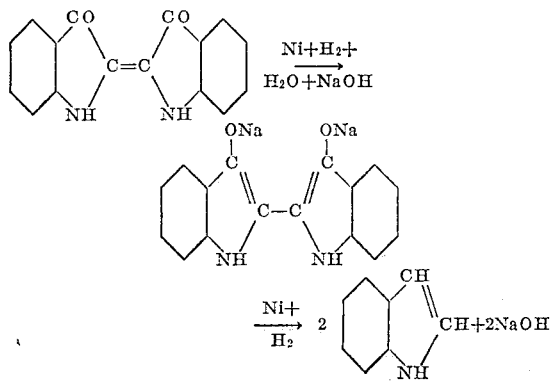

EXAMPLE II

*Catalytic hydrogenation of leuco-indigo*

Similarly, 28.6 parts of leuco-indigo

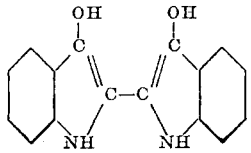

pasted with 425 parts of water 12 parts of caustic soda and 5 parts of a catalyst consisting of reduced nickel on kieselguhr are hydrogenated under pressure as described in Example I. Indole of similar quality is obtained.

It will be understood that the foregoing examples have been given for illustrative purposes only and that my invention is not to be limited to the specific embodiments disclosed therein, but I intend to claim my invention broadly as in the appended claims. It will be readily apparent to those skilled in the art that many variations and modifications can be made in the process of my invention without departing from the spirit or scope thereof. The indigo and leuco-indigo compounds, which may be treated in accordance with my invention, may be widely varied and the ingredients, proportions of ingredients, temperatures, pressures and degrees of agitation may be varied as desired within the limits hereinbefore set forth. Also, various methods may be employed for separating and purifying the indoles produced.

It will be seen that, by my invention, I have provided an economical process which is easily operated to produce substantial yields of indoles from cheap commercially available raw materials. The process does not require as careful control as other known processes for producing indoles and may be readily operated by less highly skilled workmen. Thus, by my invention, I have made a substantial and valuable advance in the art.

I claim:

1. The method of producing indoles which comprises catalytically hydrogenating an alkaline paste of a compound of the group consisting of indigos and leuco-indigos in an aqueous medium with hydrogen at a pressure of from about 300 pounds to about 2,000 pounds per square inch in the presence of an active reduced metal of the group consisting of nickel, cobalt, copper, silver, chromium, palladium and platinum for each part of the compound to be hydrogenated, at from about 190° C. to about 260° C.

2. The method of producing indoles which comprises catalytically hydrogenating an alkaline paste of a compound of the group consisting of indigos and leuco-indigos in an aqueous medium with hydrogen at a pressure of from about 500 pounds to about 1,000 pounds per square inch in the presence of from about 0.002 to about 0.09 part of an active reduced metal of the group consisting of nickel, cobalt, copper, silver, chromium, palladium and platinum for each part of the compound to be hydrogenated, at from about 200° C. to about 250° C. with agitation.

3. The method of producing indoles which comprises catalytically hydrogenating an alkaline paste of an indigo in an aqueous medium with hydrogen at a pressure of from about 300 pounds to about 2,000 pounds per square inch in the presence of from about 0.002 to about 0.09 part of an active reduced metal of the group consisting of nickel, cobalt, copper, silver, chromium, palladium and platinum for each part of the indigo, at from about 190° C. to about 260° C. with agitation.

4. The method of producing indoles which comprises catalytically hydrogenating an alkaline paste of indigo in an aqueous medium with hydrogen at a pressure of from about 300 pounds to about 2,000 pounds per square inch in the presence of from about 0.002 to about 0.09 part of an active reduced metal of the group consisting of nickel, cobalt, copper, silver, chromium, palladium and platinum for each part of the indigo, at from about 190° C. to about 260° C. with agitation.

5. The method of producing indoles which comprises catalytically hydrogenating an alkaline paste of an indigo in an aqueous medium with hydrogen at a pressure of from about 300 pounds to about 2,000 pounds per square inch in the presence of from about 0.002 to about 0.09 part of active reduced nickel for each part of the indigo, at from about 190° C. to about 260° C. with agitation.

6. The method of producing indoles which comprises catalytically hydrogenating an alkaline paste of indigo in an aqueous medium with hydrogen at a pressure of from about 300 pounds to about 2,000 pounds per square inch in the presence of from about 0.002 to about 0.09 part of active reduced nickel for each part of the indigo, at from about 190° C. to about 260° C. with agitation.

7. The method of producing indoles which comprises catalytically hydrogenating an alkaline paste of indigo in an aqueous medium with hydrogen at a pressure of from about 500 pounds to about 1,000 pounds per square inch in the presence of from about 0.003 to about 0.009 part of active rduced nickel for each part of the indigo, at from about 200° C. to about 250° C. with agitation.

8. The method of producing indole which comprises catalytically hydrogenating a caustic soda paste of indigo in water with hydrogen at about 1,000 pounds per square inch in the presence of from about 0.07 to about 0.09 part of active reduced nickel for each part of indigo at about 250° C. with vigorous agitation.

9. The method of producing indoles which comprises catalytically hydrogenating an alkaline paste of a leuco-indigo in an aqueous medium with hydrogen at a pressure of from about 300 pounds to about 2,000 pounds per square inch in the presence of from about 0.002 to about 0.09 part of an active reduced metal of the group consisting of nickel, cobalt, copper, silver, chromium, palladium and platinum for each part of the leuco-indigo, at from about 190° C. to about 260° C. with agitation.

10. The method of producing indoles which comprises catalytically hydrogenating an alkaline paste of leuco-indigo in an aqueous medium with hydrogen at a pressure of from about 300 pounds to about 2,000 pounds per square inch in the presence of from about 0.002 to about 0.09 part of an active reduced metal of the group consisting of nickel, cobalt, copper, silver, chromium, palladium and platinum for each part of the leuco-indigo, at from about 190° C. to about 260° C. with agitation.

11. The method of producing indoles which comprises catalytically hydrogenating an alkaline paste of a leuco-indigo in an aqueous medium with hydrogen at a pressure of from about 300 pounds to about 2,000 pounds per square inch in the presence of from about 0.002 to about 0.09 part of active reduced nickel for each part of the leuco-indigo, at from about 190° C. to about 260° C. with agitation.

12. The method of producing indoles which comprises catalytically hydrogenating an alkaline paste of leuco-indigo in an aqueous medium with hydrogen at a pressure of from about 300 pounds to about 2,000 pounds per square inch in the presence of from about 0.002 to about 0.09 part of active reduced nickel for each part of the leuco-indigo, at from about 190° C. to about 260° C. with agitation.

13. The method of producing indoles which comprises catalytically hydrogenating an alkaline paste of a leuco-indigo in an aqueous medium with hydrogen at a pressure of from about 500 pounds to about 1,000 pounds per square inch in the presence of from about 0.003 to about 0.009 part of active reduced nickel for each part of the leuco-indigo, at from about 200° C. to about 250° C. with agitation.

14. The method of producing indoles which comprises catalytically hydrogenating an alkaline paste of leuco-indigo in an aqueous medium with hydrogen at a pressure of from about 500 pounds to about 1,000 pounds per square inch in the presence of from about 0.003 to about 0.009 part of active reduced nickel for each part of the leuco-indigo, at from about 200° C. to about 250° C. with agitation.

15. The method of producing indole which comprises catalytically hydrogenating a caustic soda paste of leuco-indigo in water with hydrogen at about 1,000 pounds per square inch in the presence of about 0.05 to about 0.07 part of reduced nckel for each part of leuco-indigo at about 250° C. with vigorous agitation.

LOUIS SPIEGLER.